United States Patent [19]

Young et al.

[11] Patent Number: 5,014,876
[45] Date of Patent: May 14, 1991

[54] FASTENER FEED ASSEMBLY

[75] Inventors: Alfred Young, Hickory; Fred E. Church, Newton, both of N.C.

[73] Assignee: Design Tool, Inc., Hickory, N.C.

[21] Appl. No.: 260,239

[22] Filed: Oct. 20, 1988

[51] Int. Cl.⁵ .................................. B65H 5/00
[52] U.S. Cl. ........................... 221/233; 221/234; 221/266; 221/268; 221/278; 81/57.37; 81/430; 227/112
[58] Field of Search ............... 221/233, 234, 263, 264, 221/266, 268, 271, 278; 81/57.37, 430; 227/112

[56] References Cited

U.S. PATENT DOCUMENTS

| | | | |
|---|---|---|---|
| 1,703,458 | 2/1929 | Ruff | 227/112 |
| 1,980,967 | 11/1934 | De Mooy | 227/112 |
| 2,951,516 | 9/1960 | Chilton | 81/430 |
| 3,161,274 | 12/1964 | Lanz | 221/278 |
| 3,247,874 | 4/1966 | MacDonald | 144/32 |
| 3,283,985 | 11/1966 | Willis | 227/112 |
| 3,305,155 | 2/1967 | Willis | 227/116 |
| 3,494,393 | 2/1970 | Casanov | 81/57.37 |
| 3,540,622 | 11/1970 | Spisak | 221/233 |
| 3,554,403 | 1/1971 | Ginther | 221/93 |
| 3,895,431 | 7/1975 | Froehlking | 221/233 |
| 3,900,131 | 8/1973 | Ehrlich | 221/169 |
| 3,930,808 | 1/1976 | Miller et al. | 81/433 |
| 3,946,926 | 3/1976 | Willis | 227/112 |
| 3,963,456 | 6/1976 | Tsuchiya et al. | 221/266 X |
| 4,114,663 | 9/1978 | Viner | 144/32 R |
| 4,278,184 | 7/1981 | Willis | 221/233 |
| 4,333,367 | 6/1982 | Taffer | 81/430 |
| 4,625,597 | 12/1986 | Cast | 81/57.37 |

*Primary Examiner*—David H. Bollinger
*Attorney, Agent, or Firm*—Bell, Seltzer, Park & Gibson

[57] ABSTRACT

A fastener driving apparatus is disclosed which comprises a vibrating feed hopper, a fastener feed assembly for receiving the fasteners from the hopper and serially delivering the fasteners to a discharge tube which leads to an automatic screwdriver. The fastener feed assembly comprises a body member which mounts a slide for transverse sliding movement between a first position wherein the fastener is received in a notch in the slide, and a second position where the fastener is delivered to a discharge opening which leads to the discharge tube and to the screwdriver. A first air line system is provided for moving the slide toward the first or fastener receiving position, and for concurrently injecting air into the discharge opening to move a fastener previously positioned in the tube to the screwdriver. A second air line is provided for directing a stream of air into contact with the fastener at the second position so as to positively move the fastener into the discharge opening.

20 Claims, 3 Drawing Sheets

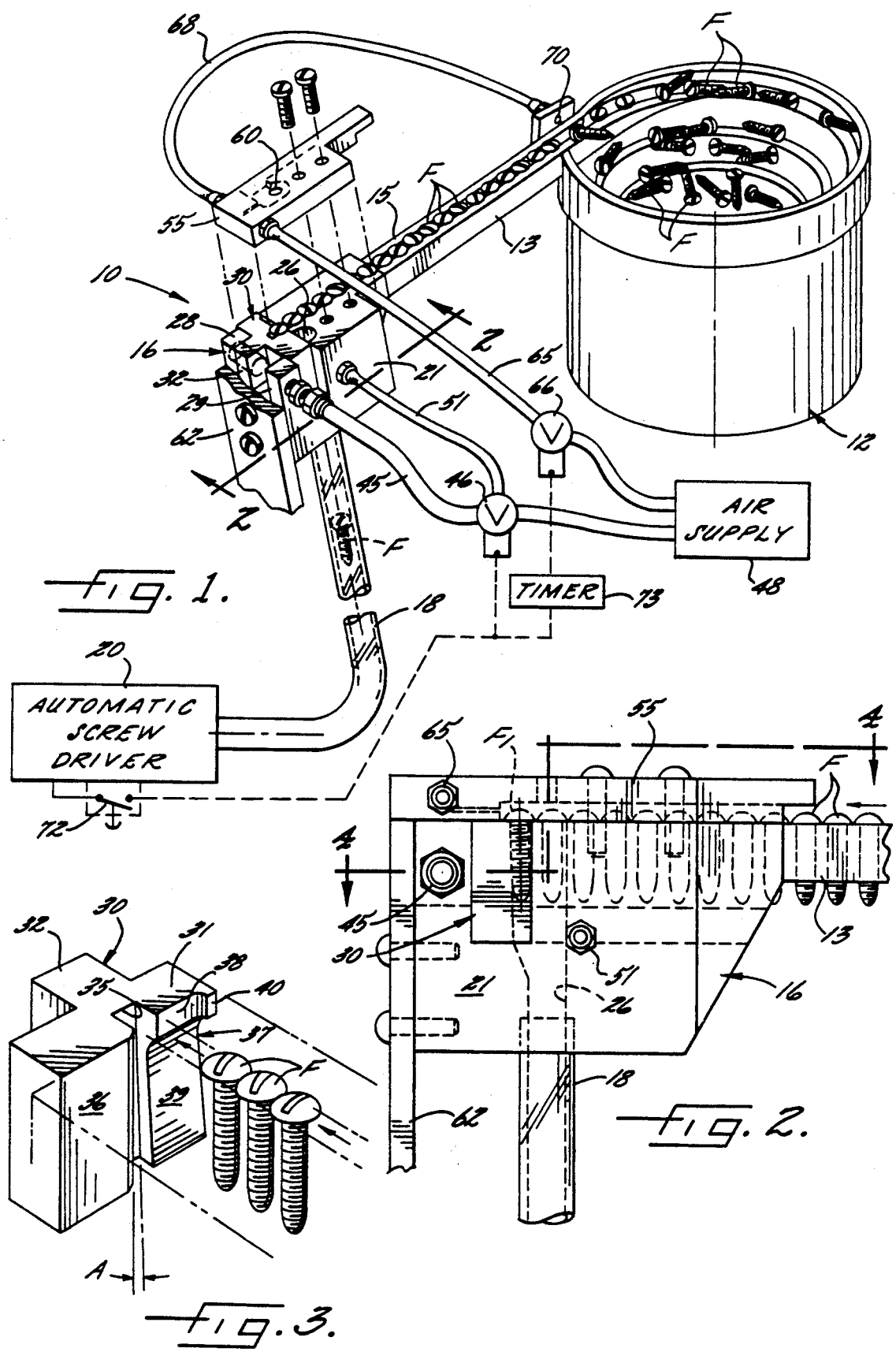

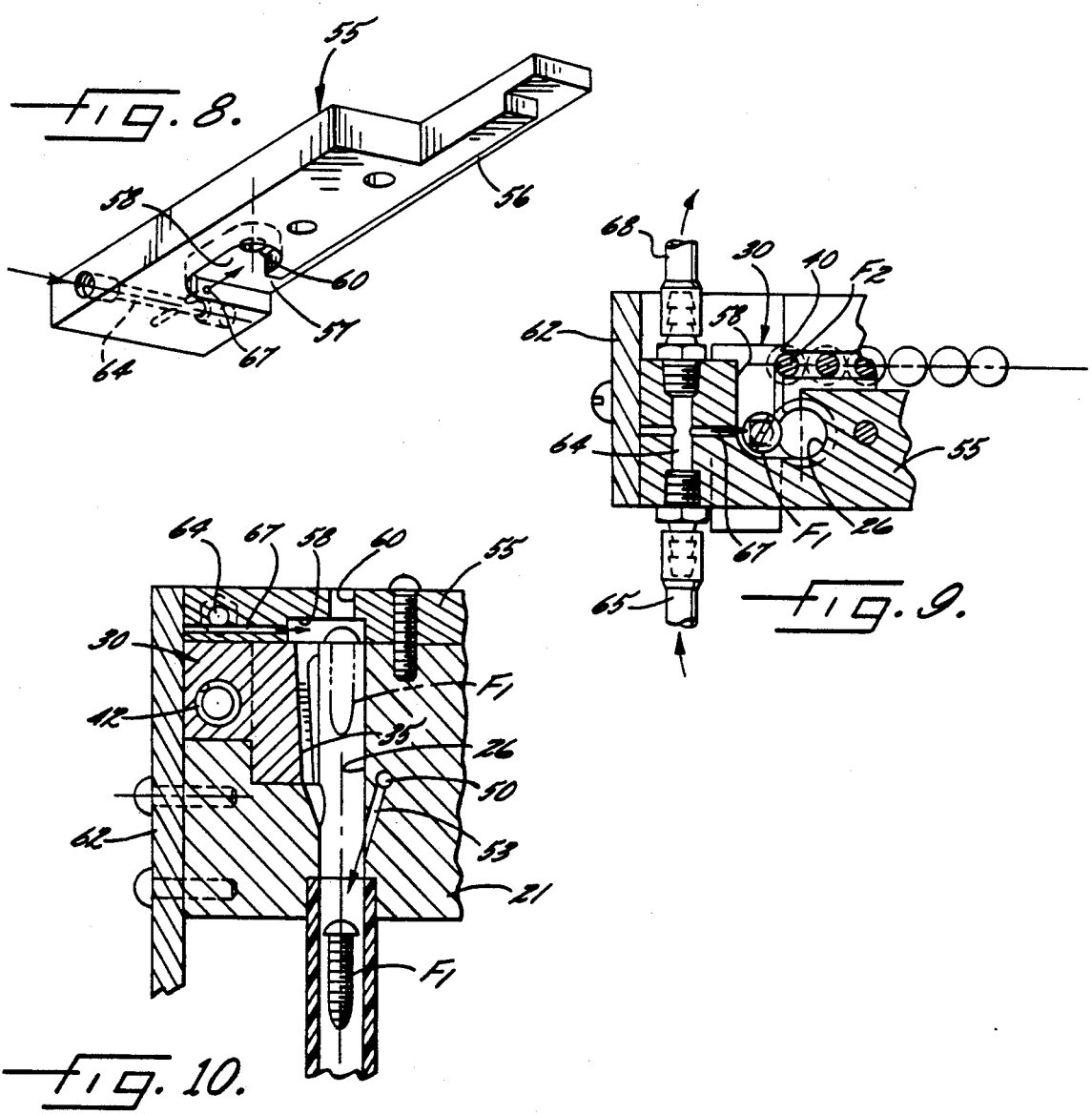

FASTENER FEED ASSEMBLY

FIELD OF THE INVENTION

The present invention relates to a fastener driving apparatus for serially driving fasteners into a workpiece, and more particularly, to a novel fastener feed assembly for serially feeding fasteners from a fastener delivery chute to a powered fastener driving device or the like.

BACKGROUND OF THE INVENTION

Power driven fastener driving apparatus for serially driving fasteners into a workpiece are known in the art. Typically, such apparatus comprise a vibrating feed hopper, and a feed or escapement assembly for receiving the fasteners from the delivery chute of the hopper, and for serially delivering them through a discharge tube to a power driven tool. Apparatus of this general type are disclosed, for example, in the U.S. Pat. No. 4,278,184 to Willis and U.S. Pat. No. 3,247,874 to MacDonald.

While the known apparatus of the described type are generally suitable for their intended use, the known feed or escapement assemblies are structurally complex, in that they utilize mechanical mechanisms to feed the fasteners into the discharge tube leading to the screwdriver. This complexity increases the cost of the assembly and reduces its reliability.

It is accordingly an object of the present invention to provide a fastener feed assembly of the described type which is of relatively simple construction, so as to minimize its cost and increase its reliability.

It is a more particular object of the present invention to provide a fastener feed assembly of the described type which has a simplified mechanism for moving the fastener into the delivery tube.

SUMMARY OF THE INVENTION

The above and other objects and advantages of the present invention are achieved in the embodiment illustrated herein by the provision of a fastener feed assembly which comprises a body member having a longitudinal slot adapted to serially receive the fasteners from the delivery chute of the feed hopper, a transverse slot communicating at right angles with said longitudinal slot, and a vertical discharge opening communicating with the transverse slot at a location transversely spaced from the longitudinal slot. A slide is mounted for transverse sliding movement in the transverse slot, the slide having a front transverse surface facing the longitudinal slot, and with the front transverse surface having a notch therein which is adapted to receive the shank of a fastener. The slide is transversely slideable between a first position wherein the notch is aligned with the longitudinal slot so as to be adapted to receive a fastener from the longitudinal slot, and a second position wherein the notch is aligned with the discharge opening. Spring biasing means is provided for biasing the slide toward one of said first and second positions, and first air line means is provided for moving the slide toward the other of said first and second positions and against the force of the spring biasing means. Second air line means is provided which is separate from the first air line means for directing a stream of air into contact with a fastener held in the notch when the slide is in the second position and so as to move the fastener into the discharge opening, and control means is provided for selectively activating the first and second air line means so as to serially move the slide to the first position to receive a fastener in the notch, and then to the second position where the fastener in the notch is positively moved into the discharge opening by the second air supply means. The fastener thus drops into the discharge opening and then into the discharge tube leading to the screwdriver.

In the preferred embodiment, the spring biasing means biases the slide toward the second position, i.e. to the position where the notch is aligned with the discharge opening, and the first air line means is adapted to move the slide toward the first position. Also, the first air line means includes means for directing a stream of air downwardly into the discharge opening concurrently with the moving of the slide toward the first position, and so that a fastener which has previously dropped into the discharge opening may be advanced to the powered fastener driving device when the slide is moved toward the first position.

BRIEF DESCRIPTION OF THE DRAWINGS

Some of the objects and advantages of the present invention having been stated, others will appear as the description proceeds, when taken in conjunction with the accompanying drawings, in which FIG. 1 is a somewhat schematic perspective view of a fastener driving apparatus which incorporates the fastener feed assembly of the present invention;

FIG. 2 is a side elevation view of the fastener feed assembly taken substantially along the line 2—2 of FIG. 1;

FIG. 3 is an enlarged perspective view of the slide of the fastener feed assembly;

FIG. 8 is a perspective view of the lower side of the cover of the fastener feed assembly;

FIG. 9 is a sectioned top plan view taken substantially along the line 9—9 of FIG. 7; and FIG. 10 is a view similar to FIG. 7, and illustrating the movement of the fastener into the delivery opening of the assembly.

DETAILED DESCRIPTION OF THE PREFERRED EMBODIMENT

Figure 4:
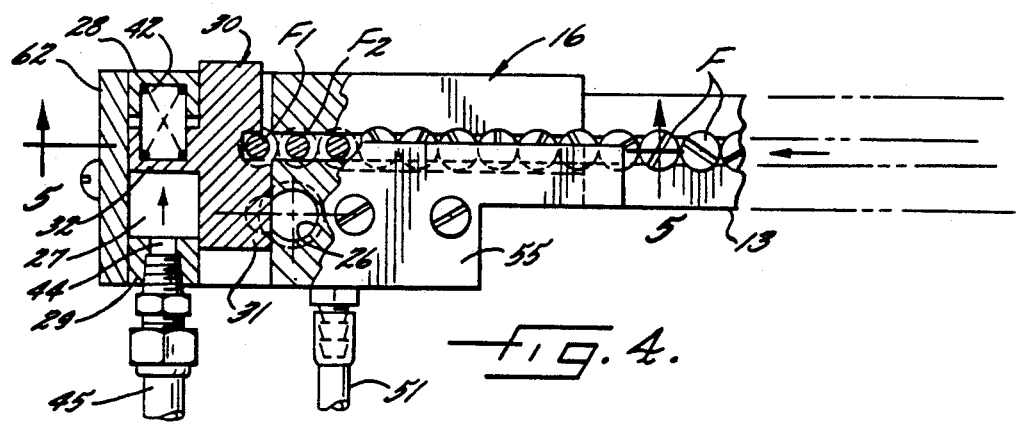
FIG. 4 is a partly sectioned top plan view of the fastener feed assembly and taken substantially along the line 4—4 of FIG. 2.

Referring more particularly to the drawings, FIG. 1 illustrates a fastener driving apparatus 10 for serially driving fasteners F into a workpiece, and which embodies the features of the present invention. In the illustrated embodiment, the fasteners F are conventional screws, of the type having a threaded shank and an enlarged head at one end of the shank.

The apparatus 10 comprises a vibrating hopper 12 of conventional design, and which is adapted to deliver the fasteners F serially along a delivery chute 13, with the chute comprising a slot for receiving the shanks of the fasteners and an upper surface 15 which supports the heads of the fasteners.

A fastener feed assembly 16 is positioned for receiving the fasteners F from the delivery chute 13 and serially delivering the same to a discharge tube 18 leading to an automatic screwdriver 20, which is schematically illustrated in FIG. 1. Automatic screwdrivers suitable for use with the present invention are known, and its specific design forms no part of the present invention.

The fastener feed assembly 16 comprises a body member 21 in the form of a metal block, which includes a longitudinal slot 22 adapted to serially receive the fasteners from the delivery chute 13 of the hopper 12. The slot 22 of the body member is dimensioned to correspond to that of the delivery chute, so that the fasteners continue their serial movement along a linear path of travel through the transition from the chute 13 to the feed assembly 16. The body member 21 also includes a transverse slot 24 which communicates at right angles with the longitudinal slot 22, and a vertical discharge opening 26 communicating with the transverse slot 24 at a location transversely spaced from the longitudinal slot 22. Also, the rear portion of the body member 21 includes an open chamber 27, which communicates with the transverse slot 24 and which defines two transversely spaced apart posts 28, 29.

A slide 30 is mounted for transverse sliding movement in the transverse slot 24, with the slide being of generally T-shaped configuration in plan view so as to define a front transverse segment 31 which is disposed in the transverse slot 24, and a rear segment 32 which is disposed in the open chamber 27 of the body member.

The front segment 31 of the slide defines a forwardly facing transverse front surface having a notch 35 therein which is sized to receive the shank of a fastener F therein. The back wall of the notch is inclined from the vertical, and as indicated by the angle A in FIG. 3. Also, and as best seen in FIG. 3, the front surface of the slide includes a first planar surface 36 on the left side of the notch as illustrated, and a second composite surface 37 on the right side of the notch. The second composite surface 37 comprises an upper portion 38 which lies rearwardly from the plane of the first planar surface 36 and which is designed to be aligned immediately below the heads of the fasteners. Further, there is a lower portion 39, which is of longer vertical dimension than the upper portion 38, and which lies rearwardly to a greater extent than does the upper portion. The lower portion 39 is also inclined from the vertical by the same angle A, and it is adapted to be aligned with a substantial portion of the length of the shanks of the fasteners. In addition, the second composite surface 37 includes a guide surface portion 40 which is co-planar with the first planar surface 36 of the front surface of the slide. The functional purposes of these structural features of the front surface of the slide are discussed below.

Figure 6:
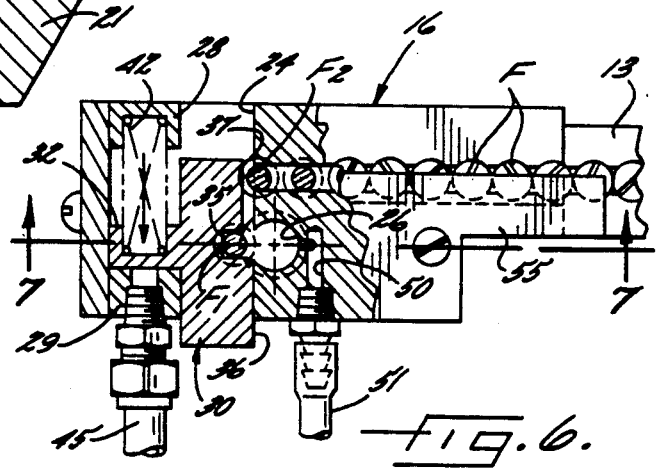
FIG. 6 is a view similar to FIG. 4, but illustrating the slide in its second position.

As best seen in FIGS. 4 and 6, the slide 30 is transversely slideable between a first position wherein the notch 35 is aligned with the longitudinal slot 22 (FIG. 4) so that the notch is adapted to receive a fastener from the longitudinal slot, and a second position (FIG. 6) wherein the notch is aligned with the discharge opening 26. A spring 42 is interposed between the rear segment 32 of the slide and post 28 of the body member, so as to bias the slide toward the second position.

First air line means is provided for moving the slide toward the second position, and against the force of the spring 42. This first air line means comprises an air passage 44 in the body member which extends through the post 29, and the passage 44 is connected to an air line 45 leading from a valve 46, which is in turn connected to an air supply 48. Thus when the valve 46 is open, pressurized air is introduced into the chamber 27 between the post 29 and rear segment 32, so as to bias the slide toward the first position as seen in FIG. 4.

Figure 7:
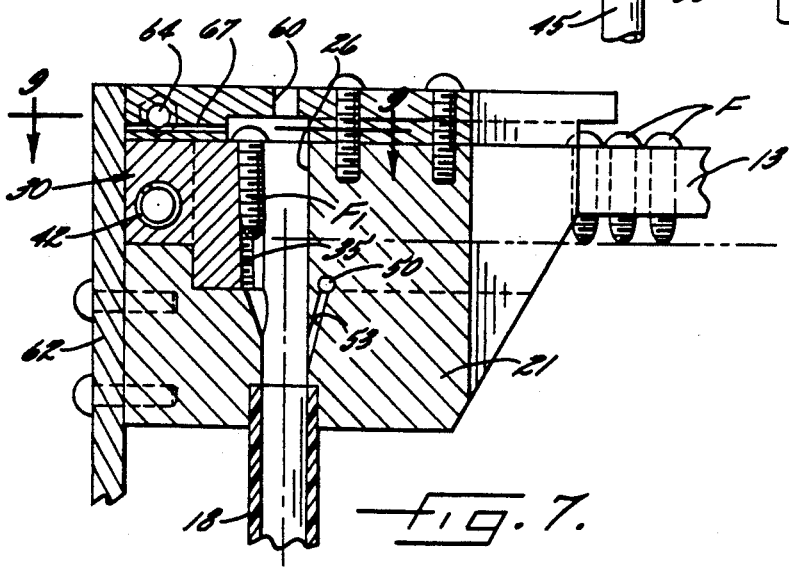
FIG. 7 is a sectioned side elevation view taken substantially along the line 7—7 of FIG. 6.

The first air line means also includes means for directing a stream of air downwardly into the discharge opening concurrently with the moving of the slide toward the first position. More particularly, the body member 21 includes an air passage 50 which is in communication with the line 51 leading from the valve 46, and the air passage 50 includes an inclined segment 53 as best seen in FIG. 7 which communicates with the discharge opening 26. The discharge tube 18 is mounted so as to communicate with the downstream end of the outlet opening 26 just below the entrance with the segment 53. Thus when the valve 46 opens, air is supplied concurrently through the lines 45 and 51 to both bias the slide toward its first position and introduce a stream of air into the discharge tube 18.

The fastener feed assembly 16 also includes a cover 55 as best seen in FIG. 8, and the bottom surface of the cover includes a longitudinal groove 56 which is positioned to overlie the longitudinal slot 22 of the body member, and such that the longitudinal groove 56 is adapted to receive the heads of the fasteners moving along the longitudinal slot 22. The cover also includes a transverse groove 57 which communicates with the longitudinal groove 56 and is positioned to overlie the interface between the front transverse surface 34 of the slide and the transverse slot 24. Thus the transverse groove 57 is adapted to receive the heads of the fasteners held in the notch 35 when the slide moves from its first position to its second position. The cover 55 further includes a central groove 58 which communicates with the transverse groove 57 and which is positioned so as to overlie the discharge opening 26. Thus the central groove 58 is adapted to receive the heads of the fasteners as they move from the notch 35 into the discharge opening 26. The central groove 58 further includes an opening 60 which admits air as a result of the entry of the air through the segment 53 into the tube 18, so as to assist in directing the fasteners downwardly into the discharge opening in the manner further described below. The feed assembly also includes a rear cover plate 62 overlying the rear of the body member 21 and covering the open chamber 27.

The fastener feed assembly 16 further comprises a second air line means which is separate from the first air line means, for directing a stream of air into contact with the head of a fastener positioned in the notch 35 when the slide is in the second position, and so as to positively move the fastener laterally into the discharge opening 26. This second air line means comprises an air line passage 64 extending laterally completely through the cover, and which is connected to an air line 65 leading to a valve 66, which in turn is connected to the air supply 48. The air line passage 64 in the cover communicates with a transverse segment 67, note FIGS. 9 and 10, which communicates with the side wall of the central groove 58. The segment 67 is longitudinally oriented so as to direct the emerging airstream across the notch 35 and toward the discharge opening 26 when the slide is in the second position. The downstream end of the air line passage 64 is connected to a further line 68, which leads to an outlet opening 70 positioned at the upstream end of the fastener delivery chute 13 of the feed hopper, and which serves to direct a continuous stream of air across the entrance of the delivery chute 13 so as to remove any misaligned fasteners by directing such fasteners inwardly back into the hopper.

The operation of the apparatus is controlled by a switch 72 which is positioned on the automatic screwdriver 20. Preferably, the screwdriver 20 is of a conventional type wherein the operator presses the end of the screwdriver against a workpiece to effect its operation, and the switch 72 is designed to be automatically closed during the screwdriving operation. The closing of the switch 72 acts to open the valve 46, which in turn moves the slide to its first position (FIG. 4), and so that the notch 35 receives the next fastener F. Concurrently, air is injected through the air line 51 and into the discharge tube 18, to propel a fastener previously dropped into the tube to the screwdriver 20. The closing of the switch 72 also acts to open the valve 66, which directs air across the central groove 58 of the cover, and the signal from the switch 72 to the valve 66 is directed through a timer 73 which holds the valve 66 open for a predetermined time period (e.g. 10–15 seconds) after the switch 72 is closed.

Upon opening of the switch 72, the valve 46 is closed and the slide 30 is moved by the spring 42 to its second position. The valve 66 remains open by reason of the timer 73, and the air stream which continues across the central groove 58 impacts upon the head of the fastener to positively move the fastener into the discharge opening 26, and so that it drops vertically into the tube 18. This fastener then remains in the tube ready to be moved to the screwdriver during the next cycle of operation.

By reason of the timer 73, the air stream through the air line 65 remains operative continuously during normal use. However, should the operator lay the screwdriver aside for more than the predetermined time delay period, the valve 66 is closed in order to preserve the air supply 48.

Figure 5:
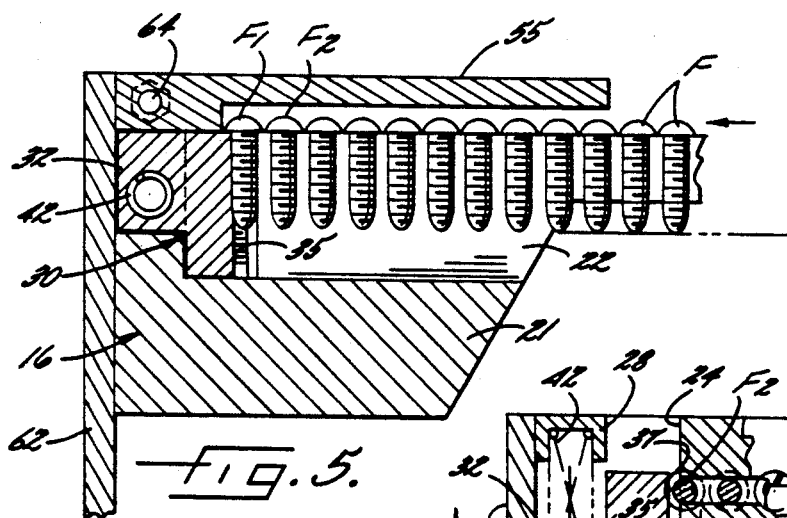
FIG. 5 is a sectioned side elevation view taken substantially along the line 5—5 of FIG. 4.

The configuration of the second composite surface 37 of the slide is designed to avoid a possible "hang-up" of the slide on the fastener which is positioned immediately behind the fastener received in the notch 35, when the slide is in the first position as seen in FIG. 4. More particularly, the trailing fastener (F2 in FIGS. 4 and 5) may tilt about the vertical axis, and so that its lower shank portion moves toward the shank of the fastener (F1) in the notch 35, and thus rearwardly behind the plane of the first planar surface 36. The relief provided by the portions 38 and 39 of the second composite surface 37 thus assures that the edge of the notch will not engage the lower shank portion of such a tilted fastener as the slide moves toward the second position. The fact that the back wall of the slot 35 and the surface portion 39 are inclined from the vertical by the angle A, permits the head portion of the fastener to enter the slot by a substantial distance, without leaving a gap along the shank and which could receive the shank of the following fastener and result in a jam. Preferably the depth of the slot 35 and the angle are dimensioned so that when a fastener is received in the slot, its shank is aligned so as to project slightly above the edge of the surface portion 39, and so as to prevent the shank of the trailing fastener from entering behind such edge. As typical examples, the angle A may range from 3° to 6°, with the angle being at the smaller end of the range for fasteners of longer length. The guide surface portion 40, which is in the plane of the first planar surface 36, is maintained in contact with the opposing surface of the slot 24 of the body member, and thus assures that the slide will not tilt during its sliding movement.

In the drawings and specification, there has been set forth a preferred embodiment of the invention, and although specific terms are employed, they are used in a generic and descriptive sense only and not for purposes of limitation.

That which is claimed is:

1. A fastener feed assembly adapted for serially feeding fasteners of the type having a shank and an enlarged head at one end of the shank, and from a fastener delivery chute to a powered fastener driving device or the like, said feed assembly comprising a body member having a longitudinal slot adapted to serially receive the fasteners from the delivery chute, a transverse slot communicating at right angles with said longitudinal slot, and a vertical discharge opening communicating with said transverse slot at a location transversely spaced from said longitudinal slot, a slide mounted for transverse sliding movement in said transverse slot, said slide having a front transverse surface facing said longitudinal slot, and with said front transverse surface having a notch therein which is adapted to receive the shank of a fastener therein, and with said slide being transversely slidable between a first position wherein said notch is aligned with said longitudinal slot so as to be adapted to receive a fastener from said longitudinal slot, and a second position wherein said notch is aligned with said discharge opening, spring biasing means for biasing said slide toward said second position, first air line means for moving said slide toward said first position and against the force of said spring biasing means, said first air line means including means for directing a stream of air downwardly into said discharge opening concurrently with the moving of said slide toward said first position, and so that a fastener which has previously dropped into said discharge opening may be advanced to the powered fastener driving device when said slide is moved toward said first position, second air line means which is separate from said first air line means for directing a stream of air into contact with a fastener held in said notch when said slide is in said second position and so as to move said fastener into said discharge opening, and control means for selectively activating said first and second air line means so as to serially move said slide to said first position to receive a fastener in said notch, and then to said second position where the fastener in said notch is moved into said discharge opening by said second air supply means, and the fastener thus drops into said discharge opening.

2. The fastener feed assembly as defined in claim 1 wherein said control means includes a first valve controlling flow through said first air line means, and a second valve controlling flow through said second air line means.

3. The fastener feed assembly as defined in claim 1 further comprising a cover attached to said body member and overlying said longitudinal and transverse slots and said discharge opening.

4. The fastener feed assembly as defined in claim 3 wherein said cover includes a longitudinal groove overlying the longitudinal slot of said body member, and such that said longitudinal groove is adapted to receive the heads of the fasteners moving along said longitudinal slot.

5. The fastener feed assembly as defined in claim 4 wherein said cover includes a transverse groove communicating with said longitudinal groove and positioned to overlie the interface between said front transverse surface of said slide and said transverse slot, and such that said transverse groove is adapted to receive the heads of the fasteners held in said notch when the slide moves from said first position to said second position.

6. The fastener feed assembly as defined in claim 5 wherein said cover further includes a central groove communicating with said transverse groove and positioned so as to overlie said discharge opening, and such that said central groove is adapted to receive the heads of the fasteners as they move from said notch into said discharge opening.

7. The fastener feed assembly as defined in claim 6 wherein said second air line means includes an air line segment within said cover which communicates with said central groove, and with said air line segment being longitudinally oriented so as to be directed across said notch and toward said discharge opening when said slide is in said second position.

8. The fastener feed assembly as defined in claim 1 wherein said front surface of said slide includes a first planar surface on the side of said notch adjacent said discharge opening, and a second surface on the side of said notch opposite said discharge opening, with said second surface having a relieved portion in alignment with the shank of the fasteners received in said notch and which lies rearwardly of the plane of said first planar surface, and so that the shank of the fastener trailing the fastener in said notch is not engaged by said slide as it moves from said first position to said second position.

9. The fastener feed assembly as defined in claim 8 wherein said second surface includes a guide surface portion transversely spaced from said notch and which is coplanar with said first planar surface of said front surface of said slide.

10. The fastener feed assembly as defined in claim 9 wherein said notch includes a back wall, and said back wall and said relieved portion are both inclined at an angle from the vertical so as to permit the head of the fastener to enter the notch a substantial distance without leaving a gap along the shank of the received fastener which could permit the shank of the trailing fastener to enter behind the level of said relieved portion.

11. A fastener feed assembly adapted for serially feeding fasteners of the type having a shank and an enlarged head at one end of the shank, and from a fastener delivery chute to a powered fastener driving device or the like, said feed assembly comprising a body member having a longitudinal slot adapted to serially receive the fasteners from the delivery chute, a transverse slot communicating at right angles with said longitudinal slot, and a vertical discharge opening communicating with said transverse slot at a location transversely spaced from said longitudinal slot, a slide mounted for transverse sliding movement in said transverse slot, said slide having a front transverse surface facing said longitudinal slot, and with said front transverse surface having a notch therein which is adapted to receive the shank of a fastener therein, and with said slide being transversely slideable between a first position wherein said notch is aligned with said longitudinal slot so as to be adapted to receive a fastener from said longitudinal slot, and a second position wherein said notch is aligned with said discharge opening, spring biasing means for biasing said slide toward said second position, air line means for moving said slide toward said first position against the force of said spring biasing means, and for concurrently directing a stream of air downwardly into said discharge opening, means for positively moving a fastener positioned in said notch into said discharge opening when said slide is in said second position, and control means for selectively activating said air line means so as to move said slide to said first position to receive a fastener in said notch, while directing a stream of air downwardly into said discharge opening and so that a fastener which has previously dropped into said discharge opening may be advanced to the powered fastener driving device, and then to move said slide to said second position where the fastener in said notch is moved into said discharge opening by said fastener moving means.

12. A fastener driving apparatus for serially driving fasteners into a workpiece, with the fasteners being of the type having a shank and an enlarged head at one end of the shank, said apparatus comprising hopper means for delivering the fasteners serially along a delivery chute, fastener feed assembly means for receiving the fasteners from said delivery chute and serially delivering the same to a discharge tube, said fastener feed assembly means comprising (a) a body member having a longitudinal slot positioned to serially receive the fasteners from said delivery chute, a transverse slot communicating at right angles with said longitudinal slot, and a vertical discharge opening communicating with said transverse slot at a. location transversely spaced from said longitudinal slot, and with said discharge opening being connected to said discharge tube, (b) a slide mounted for transverse sliding movement in said transverse slot, said slide having a front transverse surface facing said longitudinal slot, and with said front transverse surface having a notch therein which is adapted to receive the shank of a fastener therein, and with said slide being transversely slideable between a first position wherein said notch is aligned with said longitudinal slot so as to be adapted to receive a fastener from said longitudinal slot, and a discharge opening, (c) spring biasing means for biasing said slide toward said second position, powered fastener driving means for serially receiving the fasteners from said discharge tube and driving them into a workpiece, and control means comprising a switch mounted on said fastener driving means, and air valve means operatively controlled by said switch for moving said slide of said feed assembly means toward said first position against the force of said spring biasing means to permit receipt of a fastener into said notch from said longitudinal slot and for concurrently directing an air stream through said discharge tube to deliver a fastener previously located in said tube to said fastener driving means upon closing of said switch, and such that said slide is returned to said second position to transfer a fastener retained in said notch to said discharge opening upon the opening of said switch, whereby the fasteners may be serially delivered to said driving means by the serial actuation of said switch.

13. The fastener driving apparatus as defined in claim 12 further comprising air line means for directing a stream of air into contact with a fastener held in said notch when said slide is in said second position and so as to move said fastener into said discharge opening.

14. The fastener driving apparatus as defined in claim 13 wherein said air line means includes an air line for delivering a stream of air laterally across said delivery chute to remove excess fasteners therefrom.

15. The fastener driving apparatus as defined in claim 13 wherein said air line means includes timer means for maintaining said air line means activated for a predetermined time period after the opening of said switch of said control means.

16. A fastener feed assembly adapted for serially feeding fasteners of the type having a shank and an enlarged head at one end of the shank, and from a fastener delivery chute to a powered fastener driving device or the like, said feed assembly comprising
   a body member having a longitudinal slot adapted to serially receive the fasteners from the delivery chute, a transverse slot communicating at right angles with said longitudinal slot, and a vertical discharge opening communicating with said transverse slot at a location transversely spaced from said longitudinal slot,
   a slide mounted for transverse sliding movement in said transverse slot, said slide having a front transverse surface facing said longitudinal slot, and with said front transverse surface having a notch therein which is adapted to receive the shank of a fastener therein, and with said slide being transversely slidable between a first position wherein said notch is aligned with said longitudinal slot so as to be adapted to receive a fastener from said longitudinal slot, and a second position wherein said notch is aligned with said discharge opening,
   spring biasing means for biasing said slide toward one of said first and second positions,
   first air line means for moving said slide toward the other of said first and second positions against the force of said spring biasing means,
   second air line means which is separate from said first air line means for directing a stream of air into contact with a fastener held in said notch when said slide is in said second position and so as to move said fastener into said discharge opening,
   control means for selectively activating said first and second air line means so as to serially move said slide to said first position to receive a fastener in said notch, and then to said second position where the fastener in said notch is moved into said discharge opening by said second air supply means, and the fastener thus drops into said discharge opening, and
   a cover attached to said body member and overlying said longitudinal and transverse slots and said discharge opening, said cover including a longitudinal groove overlying the longitudinal slot of said body member, and such that said longitudinal groove is adapted to receive the heads of the fasteners moving along said longitudinal slot.

17. The fastener feed assembly as defined in claim 16 wherein said cover includes a transverse groove communicating with said longitudinal groove and positioned to overlie the interface between said front transverse surface of said slide and said transverse slot, and such that said transverse groove is adapted to receive the heads of the fasteners held in said notch when the slide moves from said first position to said second position.

18. The fastener feed assembly as defined in claim 17 wherein said cover further includes a central groove communicating with said transverse groove and positioned so as to overlie said discharge opening, and such that said central groove is adapted to receive the heads of the fasteners as they move from said notch into said discharge opening.

19. The fastener feed assembly as defined in claim 18 wherein said second air line means includes an air line segment within said cover which communicates with said central groove, and with said air line segment being longitudinally oriented so as to be directed across said notch and toward said discharge opening when said slide is in said second positions.

20. A fastener feed assembly adapted for serially feeding fasteners of the type having a shank and an enlarged head at one end of the shank, and from a fastener delivery chute to a powered fastener driving device or the like, said feed assembly comprising
   a body member having a longitudinal slot adapted to serially receive the fasteners from the delivery chute, a transverse slot communicating at right angles with said longitudinal slot, and a vertical discharge opening communicating with said transverse slot at a location transversely spaced from said longitudinal slot,
   a slide mounted for transverse sliding movement in said transverse slot, said slide having a front transverse surface facing said longitudinal slot, and with said front transverse surface having a notch therein which is adapted to receive the shank of a fastener therein, and with said slide being transversely slidable between a first position wherein said notch is aligned with said longitudinal slot so as to be adapted to receive a fastener from said longitudinal slot, and a second position wherein said notch is aligned with said discharge opening, said front surface of said slide including a first planar surface on the side of said notch adjacent said discharge opening, and a second surface on the side of said notch opposite said discharge opening, with said second surface having a relieved portion in alignment with the shank of the fasteners received in said notch and which lies rearwardly of the plane of said first planar surface, and so that the shank of the fastener trailing the fastener in said notch is not engaged by said slide as it moves from said first position to said second position, said second surface including a guide surface portion transversely spaced from said notch and which is coplanar with said first planar surface of said front surface of said slide, and said notch including a back wall, and said back wall and said relieved portion being both inclined at an angle from the vertical so as to permit the head of the fastener to enter the notch a substantial distance without leaving a gap along the shank of the received fastener which could permit the shank of the trailing fastener to enter behind the level of said relieved portion, spring biasing means for biasing said slide toward one of said first and second positions, first air line means for moving said slide toward the other of said first and second positions against the force of said spring biasing means, second air line means which is separate from said first air line means for directing a stream of air into contact with a fastener held in said notch when said slide is in said second position and so as to move said fastener into said discharge opening, and control means for selectively activating said first and second air line means so as to serially move said slide to said first position to receive a fastener in said notch, and then to said second position where the fastener in said notch is moved into said discharge opening by said second air supply means, and the fastener thus drops into said discharge opening.

* * * * *